United States Patent [19]

Koyama et al.

[11] Patent Number: 5,659,398
[45] Date of Patent: Aug. 19, 1997

[54] RECORDING APPARATUS FOR AN IMAGE HAVING AN EDITED REGION

[75] Inventors: Toshiya Koyama; Hiroshi Sekine, both of Ebina, Japan

[73] Assignee: Fuji Xerox Co., Ltd., Tokyo, Japan

[21] Appl. No.: 321,303

[22] Filed: Oct. 11, 1994

[30] Foreign Application Priority Data

Nov. 15, 1993 [JP] Japan .................. 5-284862

[51] Int. Cl.$^6$ .................. H04N 1/387; H04N 1/46
[52] U.S. Cl. .................. 358/296; 358/406; 358/452; 358/453; 358/504; 358/537; 358/538
[58] Field of Search .................. 358/296, 406, 358/452, 453, 471, 474, 504, 505, 537, 538; 395/146; 382/309, 312, 319

[56] References Cited

U.S. PATENT DOCUMENTS

| | | | |
|---|---|---|---|
| 4,978,226 | 12/1990 | Moriya et al. | 358/538 |
| 5,016,096 | 5/1991 | Matsunawa et al. | 358/538 |
| 5,113,251 | 5/1992 | Ihciyanagi et al. | 358/75 |
| 5,136,399 | 8/1992 | Aoyama | 358/296 |
| 5,148,294 | 9/1992 | Kurogane et al. | 358/448 |
| 5,270,249 | 12/1993 | Fukuma . | |

FOREIGN PATENT DOCUMENTS

| | | |
|---|---|---|
| 63-253969 | 10/1988 | Japan . |
| 2-224568 | 9/1990 | Japan . |
| 2-277174 | 11/1990 | Japan . |
| 4-274617 | 9/1992 | Japan . |

*Primary Examiner*—Peter S. Wong
*Assistant Examiner*—Eric Frahm
*Attorney, Agent, or Firm*—Oliff & Berridge

[57] ABSTRACT

An image recording apparatus for setting an edit region by preliminary scanning of an original and recording an edited image by main scanning of the original includes a designation input device; a bit map memory; an edit information processing device; an image processing device; a recording device; and a control device. The image recording apparatus permits the same edited image data that is used for a test record to be used for a final record.

15 Claims, 9 Drawing Sheets

COLORING OF THE BACKGROUND OF CHARACTERS IN DESIGNATED REGION

PAINTING OF DESIGNATED REGION

COLORING OF THE BACKGROUND OF CHARACTERS IN DESIGNATED REGION. AND COLORING OF THE CHARACTERS IN DIFFERENT COLORS

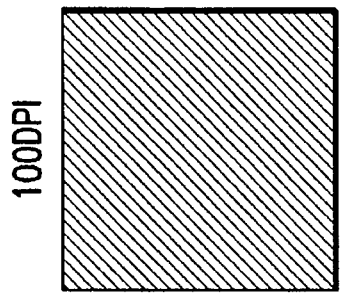
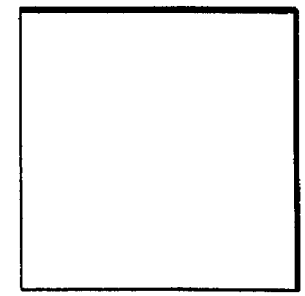
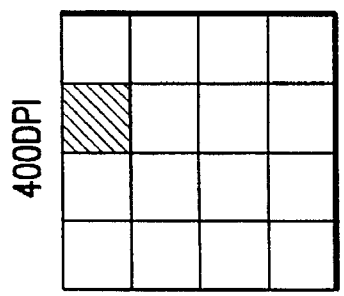
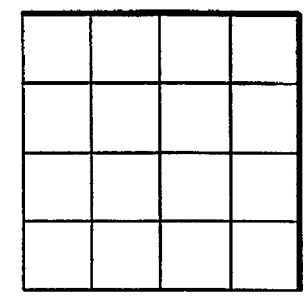
FIG.9A
FIG.9B

RECORDING APPARATUS FOR AN IMAGE HAVING AN EDITED REGION

BACKGROUND OF THE INVENTION

1. Field of the Invention

The present invention relates to an image recording apparatus for setting an edit region by preliminary scanning of an original and recording an edited image by main scanning of the original.

2. Description of the Related Art

In an image recording apparatus such as a digital copying machine, an image of an original is read by an image input device and is converted into an electrical signal as an image signal. The image signal is subjected to various image processing and is thereafter recorded by an image output device such as a laser printer.

In such an image recording apparatus, there has been proposed image editing means for editing an image of an original by designating a point present in a region surrounded by a closed line on the original (this region will be hereinafter referred to as a closed region), performing preliminary scanning of the original to input original information into bit map memory planes, recognizing the closed region designated above from the original information input in the bit map memory planes, and performing edit processing to the whole or a part of the closed region designated on the original (e.g., Japanese Patent Laid-open Nos. Hei 2-224568 and Hei 2-277174 and Japanese Patent Application No. Hei 4-274617).

In such an image recording apparatus, when a plurality of records are desired to be output after performing the edit processing to the input original image, the number of records is preliminarily set and thereafter recording is instructed. However, there is a possibility that the records each having a desired edited image may not be obtained because of operation error or the like. In this case, if the set number of records is large, many recording sheets and much recording material and time are wasted.

Furthermore, every time the recording is instructed, the preliminary scanning is performed to input the original information into the bit map memory planes. That is, until the record having a desired edited image is obtained, the operation inclusive of editing and recording instruction must be repeated many times and the preliminary scanning must also be performed repeatedly.

Moreover, there is a possibility that an error may be generated between the repetitions of the preliminary scanning because of vibration and heat of the recording apparatus, resulting in an error between the original information input in the bit map memory planes. In view of this, a test record is first made to check whether the edited image output is desirable or not, and thereafter a final record is made to output a plurality of records. However, even if the desired edited image is obtained in the test record, the same desired edited image as that obtained in the test record cannot possibly be obtained in the final record because of a difference in edit region between the test record and the final record due to the above-mentioned error in the preliminary scanning. In other words, the edited image obtained in the final record becomes different from the edited image obtained in the test record.

SUMMARY OF THE INVENTION

It is accordingly an object of the present invention to provide an image recording apparatus which can output the same edited image both in the test record and the final record subsequent to the test record.

According to the present invention, there is provided an image recording apparatus for setting an edit region by preliminary scanning of an original and recording an edited image by main scanning of the original, the image recording apparatus comprising designation input means for inputting designation of output content of the edited image and designation of edit content to the original; a bit map memory for storing edit information in an image region of the original; edit information processing means for setting the edit information in the image region of the original stored in the bit map memory upon the preliminary scanning according to the edit content designated by the designation input means and for reading the edit information from the bit map memory in synchronism with reading of the original upon the main scanning; image processing means for performing edit processing in the image region of the original according to the edit information read from the bit map memory upon the main scanning; recording means for recording the edited image; and control means for performing the preliminary scanning and the main scanning to output a test record of the edited image when designation of the test record is input from the designation input means and then performing only the main scanning without the preliminary scanning but using the edit information stored in the bit map memory to output a final record of the edited image when designation of the final record is input from the designation input means after the test record.

The control means may output a black-and-white image as the edited image in making the test record.

Further, the control means may output a plurality of records each having the edited image less in number by one than a set value designated by the designation input means in making the final record after the test record.

In the image recording apparatus according to the present invention, the designation input means inputs designation of output content of the edited image and designation of edit content of the original. The bit map memory stores edit information in an image region of the original. The edit information processing means sets the edit information in the image region of the original stored in the bit map memory upon the preliminary scanning according to the edit content designated by the designation input means and reads the edit information from the bit map memory in synchronism with reading of the original upon the main scanning. The image processing means performs edit processing in the image region of the original according to the edit information read from the bit map memory upon the main scanning. The recording means records the edited image. The control means performs the preliminary scanning and the main scanning to output a test record of the edited image when designation of the test record is input from the designation input means and then performs only the main scanning without the preliminary scanning by the use of the edit information stored in the bit map memory to output a final record of the edited image when designation of the final record is input from the designation input means after the test record. When an operator operates the designation input means to designate output of the test record, the control means outputs the test record having the edited image obtained by edit processing according to the edit information input into the bit map memory by the preliminary scanning. If this test record is satisfactory for the operator, the control means outputs the final record after the test record by using the edit information stored in the bit map memory without performing the preliminary scanning. Thus, after the desired test record is obtained, the preliminary scanning for recreating the edit information is not performed, with the result that the same edited image as that obtained in the test record can be obtained in the final record.

In the case where the image recording apparatus is a color image forming apparatus, color output of the edited image causes an increase in cost and requires much time for recording in general. In view of this, black-and-white output of the edited image may be substituted for the color output in outputting the test record by applying halftone, shading, etc. to the edit region. Thus, the cost and time for recording can be reduced.

In the color image recording apparatus, when the edited image is colored in the test record, the number of records less by one than a set value originally designated may be automatically set in making the final record, because at least one record having a desired edited image can be obtained in making the test record. Thus, a desired number of records can be finally obtained without waste.

As described above, according to the present invention, after obtaining a desired output result in the test record, the preliminary scanning for re-creation of edit information is not performed, but the edit information previously created and stored in making the test record is used in making the final record. As a result, the same output image as that obtained in the test record can be obtained in the final record, thereby reducing the waste of cost and time due to erroneous output. Further, even when the test record is made several times to obtain a desired edited image, the cost and time for recording can be reduced by replacing color output with black-and-white output. Further, even when the edited image is colored in the test record in the color image recording apparatus, a desired number of records can be obtained without waste in the final record by automatically setting the number of records less by one than a set value in making the final record, because at least one record having a desired edited image can be obtained in making the test record.

Other objects and features of the invention will be more fully understood from the following detailed description and appended claims when taken with the accompanying drawings.

BRIEF DESCRIPTION OF THE DRAWINGS

FIGS. 9A and 9B are schematic views illustrating an example of density conversion of image data to be input into the bit map memory.

DETAILED DESCRIPTION OF THE PREFERRED EMBODIMENTS

A preferred embodiment of the present invention will now be described with reference to the drawings.

Figure 1:
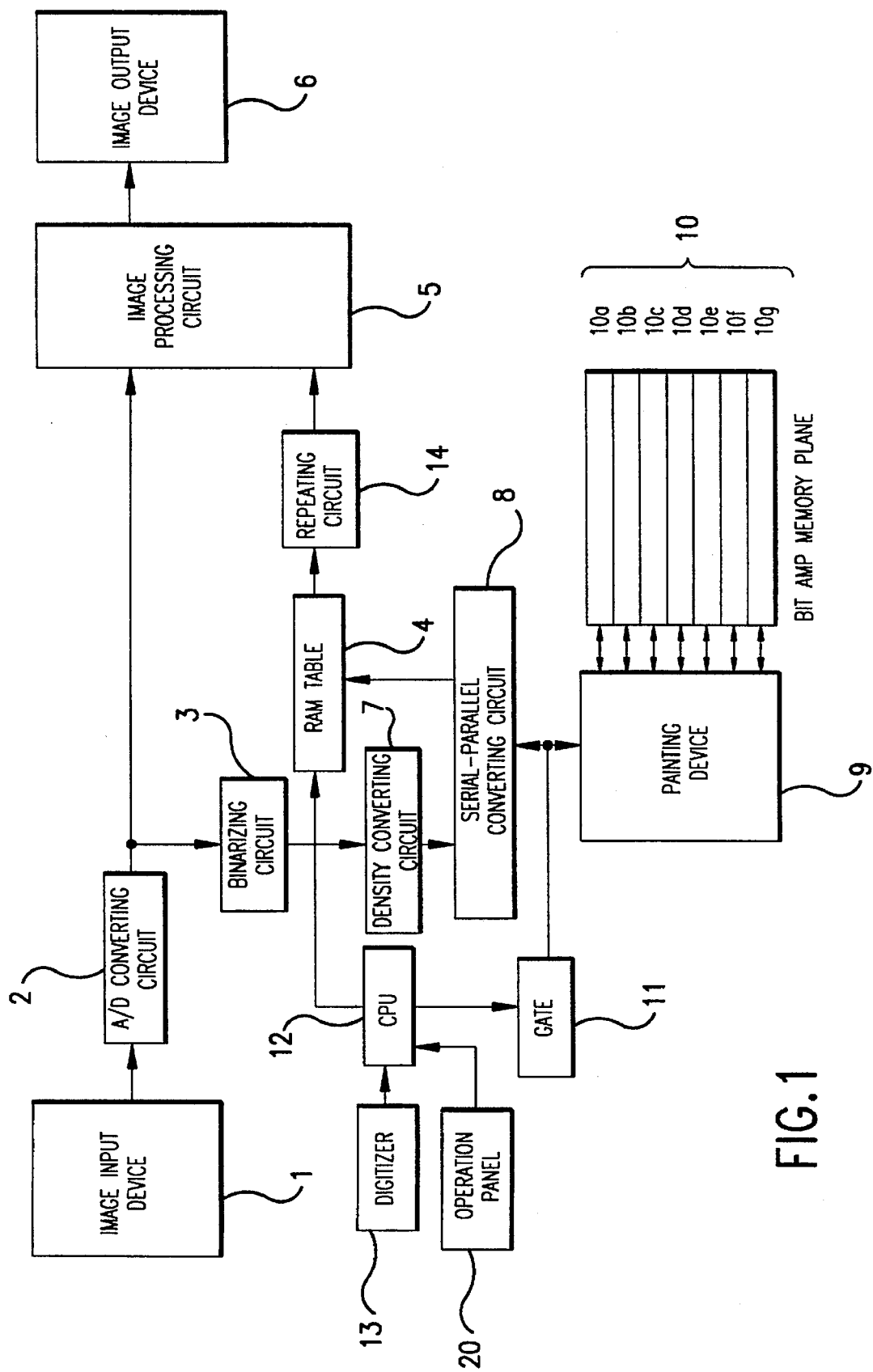
FIG. 1 is a block diagram of an image recording apparatus according to a preferred embodiment of the present invention.
Figure 2:
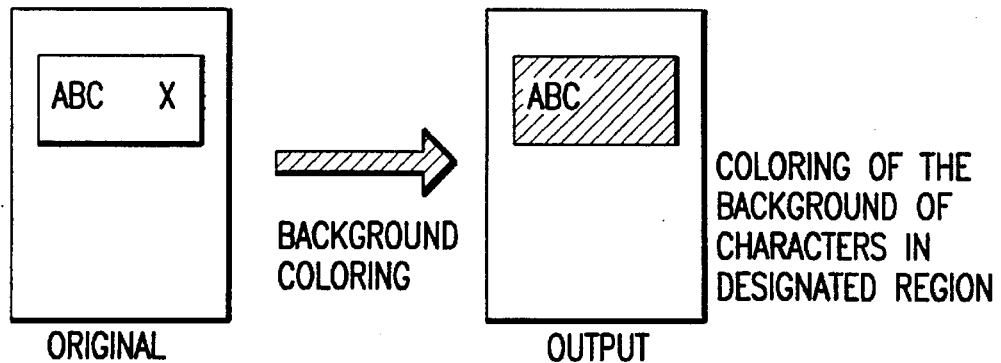
FIG. 2 is a view illustrating examples of edit processing according to the preferred embodiment.
Figure 2:
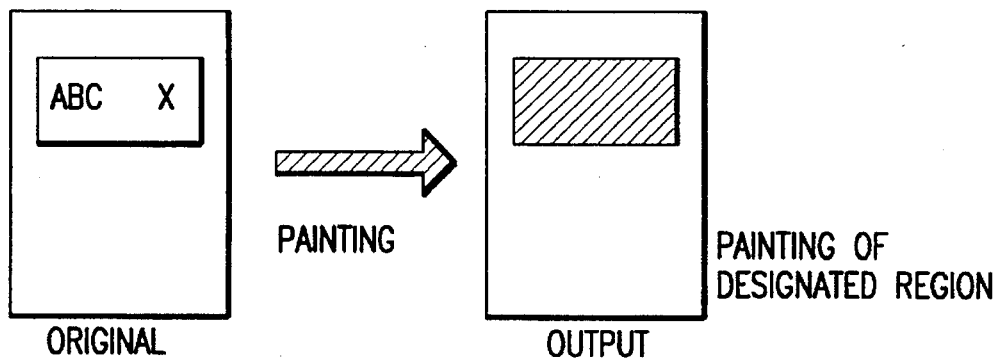
Figure 2:
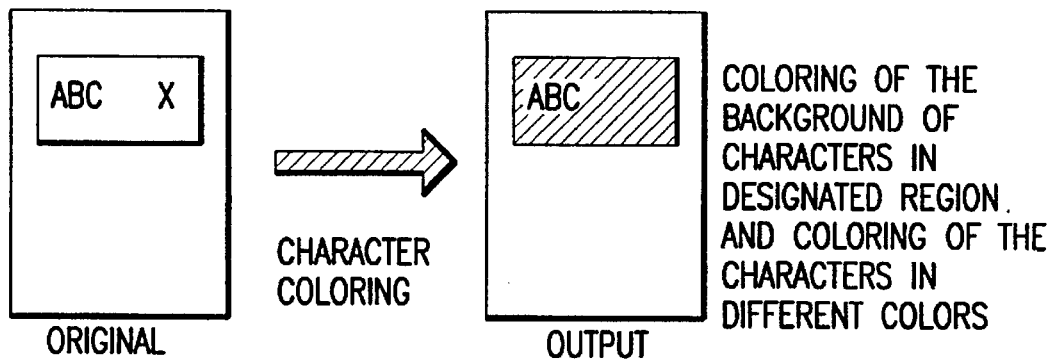

Referring to FIG. 1 which shows an image recording apparatus according to the preferred embodiment, reference numeral 1 denotes an image input device for optically scanning an original to read information of the original and converting the information into an electrical signal as an image signal for each color. The image signal output from the image input device 1 is converted into a digital signal by an A/D converting circuit 2, and is then fed to an image processing circuit 5. The image processing circuit 5 functions to process the image signal for each color and generate a record signal for recording an image. The image processing circuit 5 also functions to perform edit processing such as background coloring (coloring of the background of characters in a designated region), painting (painting of a designated region), and character coloring (coloring of the background of characters in a designated region in one color and coloring of the characters in another color different from the color of the background) as shown in FIG. 2. Reference numeral 4 denotes a RAM (Random Access Memory) table preliminarily storing functional codes indicating various kinds of edit processing inclusive of the background coloring, the painting, and the character coloring as mentioned above. A desired one of the functional codes is read from the RAM table 4 and the corresponding edit processing is performed according to the read functional code by the image processing circuit 5. Reference numeral 6 denotes an image output device such as a laser printer for generating as an image the image signal processed by the image processing circuit 5. That is, the original image is edited by the image processing circuit 5 and the edited image thus obtained is recorded in each color by the image output device 6.

Figure 3:
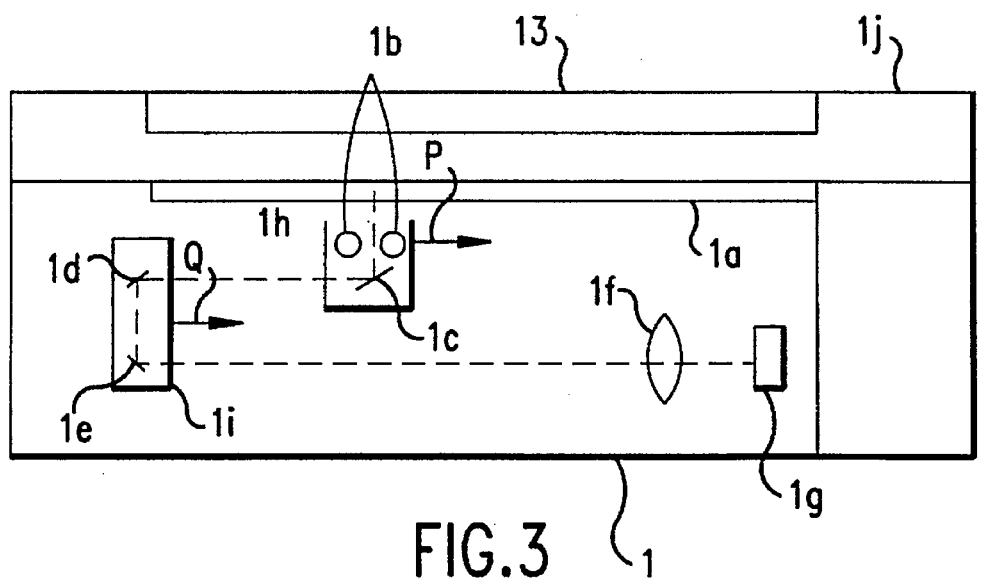
FIG. 3 is a schematic sectional side view of an image input device in the image recording apparatus shown in FIG. 1.

Referring to FIG. 3 which shows the image input device 1, it includes a platen glass 1a on which an original (not shown) is placed, a light source 1b for directing light through the platen glass 1a onto the original, a plurality of mirrors 1c, 1d, and 1e for reflecting the light reflected on the original, a lens 1f for imaging the light reflected on the mirrors 1c, 1d, and 1e, and an image sensor 1g for detecting the light imaged by the lens 1f and generating an image signal. The light source 1b and the mirror 1c are mounted on a full-speed carriage 1h, and the mirrors 1d and 1e are mounted on a half-speed carriage 1i. The full-speed carriage 1h is moved in a direction depicted by an arrow P along a lower surface of the platen glass 1a, and the half-speed carriage 1i is also moved in the same direction depicted by an arrow Q as the direction P at a speed half that of the full-speed carriage 1h, thereby reading an image of the original with a resolution of 400 dots per inch (400 dpi), for example.

The image signal from the image input device 1 is converted into a digital signal by the A/D converting circuit 2, and is then input into a binarizing circuit 3. The binarizing circuit 3 functions to extract image brightness information or given color information from the image signal and binarize the information extracted. An output from the binarizing circuit 3 is supplied through a density converting circuit 7 and a serial-parallel converting circuit 8 to a painting device 9. The painting device 9 functions to write the original image into a bit map memory 10. The bit map memory 10 is composed of seven bit map memory planes 10a, 10b, 10c, 10d, 10e, 10f, and 10g each having a bit density of 100 dots per inch (100 dpi), for example. The original image read by the image input device 1 is written into the bit map memory plane 10a. The bit map memory planes 10b and 10c are used as a working area for extraction of a closed region designated. The bit map memory planes 10d to 10g are used as an expanding area for expansion of an edit region. The bit map memory planes 10d to 10g are weighted in the order of "1", "2", "4", and "8", respectively. Accordingly, writing of "0100" at given bits in the memory planes 10d to 10g means writing of "2".

The painting device 9 is provided to perform writing into the bit map memory 10 at high speeds in such manner that in receipt of coordinate data, kind of processing, etc. from the outside, the painting device 9 performs drawing of straight lines, painting of closed regions, copying between the memory planes 10a to 10g, etc. in the bit map memory 10 according to a known algorithm. The painting of the closed regions means setting to a given state the bits at addresses corresponding to the closed regions in the bit map memory 10.

A CPU (Central Processing Unit) 12 is connected through a gate 11 to the painting device 9. The gate 11 remains closed while scanning is being performed by the image input device 1, whereas the gate 11 remains open otherwise. The CPU 12 functions to perform writing of a functional code into the RAM table 4 and control of the painting device 9. That is, the CPU 12 functions to replace the contents in the RAM table 4 according to designation from a digitizer 13 and apply to the painting device 9 a designation of which area in the bit map memory 10 should be painted. The digitizer 13 has a plane with an area corresponding to A3-size paper, for example, and is designed to provide coordinate data corresponding to a position on the plane pressed with a pen or the like.

Figure 4:
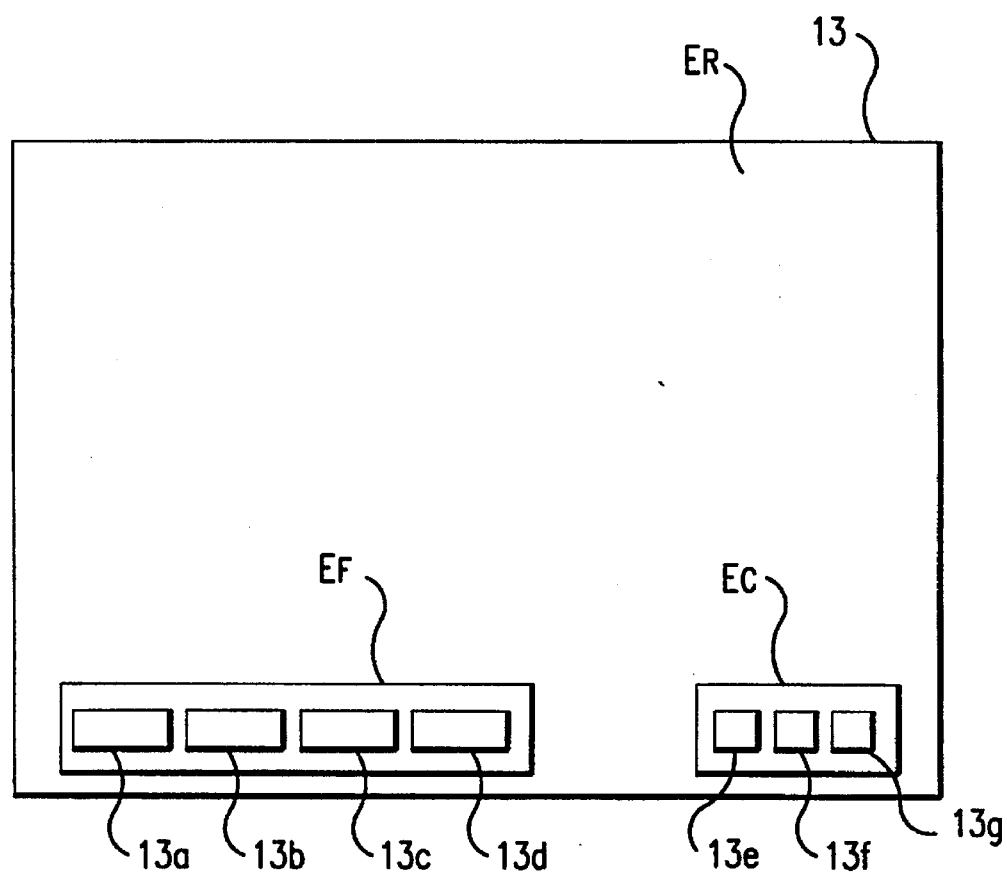
FIG. 4 is a schematic plan view of a digitizer in the image recording apparatus shown in FIG. 1.

Referring to FIG. 4 which shows the digitizer 13, the plane of the digitizer 13 is divided into a region designation area ER for designating an edit region, a function designation area EF for designating the kind of edit processing, and a color designation area EC for designating a color to be used in the edit region. The edit region is designated by placing an original on the region designation area ER and then pressing a desired point on the original with a pen or the like. The function designation area EF is formed with a plurality of windows 13a, 13b, 13c, and 13d corresponding to various kinds of edit processing. For example, the windows 13a, 13b, 13c, and 13d correspond to a switch for designation of a frame defining the edit region, a switch for designation of the background coloring, a switch for designation of the painting, and a switch for designation of the character coloring, respectively. The color designation area EC is also formed with a plurality of windows 13e, 13f, and 13g corresponding to various colors. For example, the windows 13e, 13f, and 13g correspond to a switch of designation of red, a switch for designation of blue, and a switch for designation of green, respectively. In addition to these switches, there may be provided a switch for designation of a rectangle defining method for defining a rectangular region by designating coordinates of two points, or a switch for designation of a free shape defining method for defining a free-shaped region by designating coordinates of many points. When the function designation area EF is pressed, the CPU 12 processes the coordinate data input in the region designation area ER as function information. Further, when the color designation area EC is pressed, the CPU 12 processes the coordinate data as color information. As shown in FIG. 3, the digitizer 13 is provided on an upper surface of a platen cover 1j for openably covering the platen glass 1a of the image input device 1.

Figure 5:
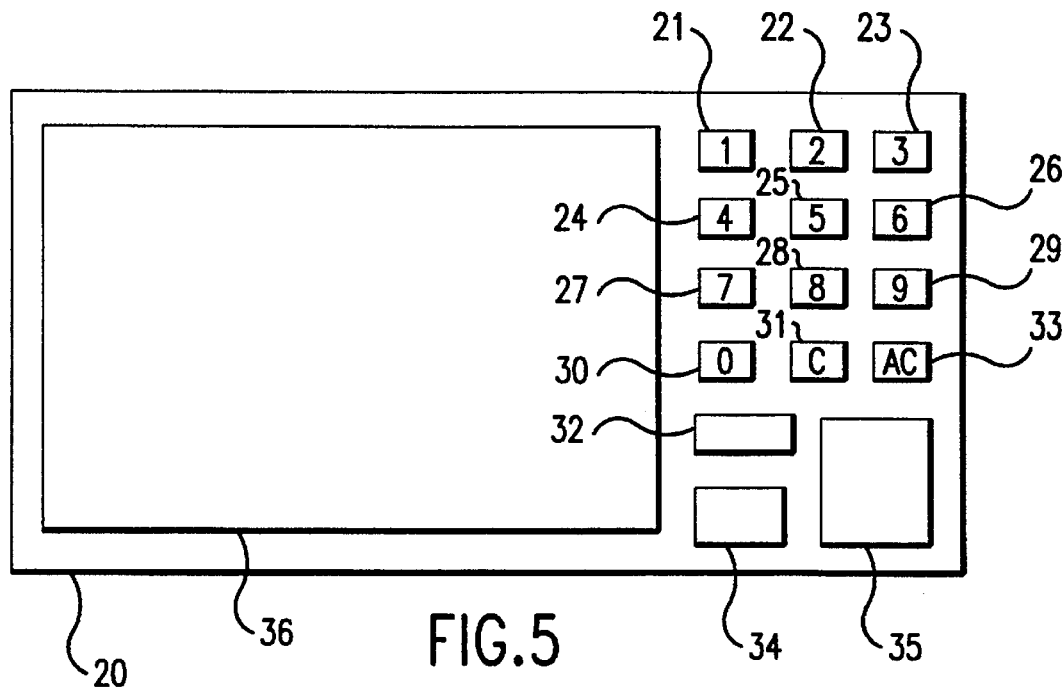
FIG. 5 is a schematic plan view of an operation panel in the image recording apparatus shown in FIG. 1.

Referring to FIG. 5 which shows an operation panel 20, it includes a set of numeric keys 21, 22, 23, 24, 25, 26, 27, 28, 29, and 30 corresponding to the numbers of 1, 2, 3, 4, 5, 6, 7, 8, 9, and 0, respectively, for setting the number of sheets of paper to be recorded, a clear key 31 for clearing input from the numeric keys 21 to 30, an interrupt key 32 for designating interrupt processing, an all-clear key 33 for clearing all set values and conditions, a stop key 34 for temporarily stopping a recording operation, a start key 35 for starting a recording operation, and a touch panel display 36 for displaying various functions, conditions of the apparatus, the set number of sheets of paper to be recorded, necessary operations and messages, etc. In addition to these keys, there may be actually provided a key for setting a magnification for enlargement and reduction in scale of the original image, or a key for setting an output paper size.

Figure 6A:
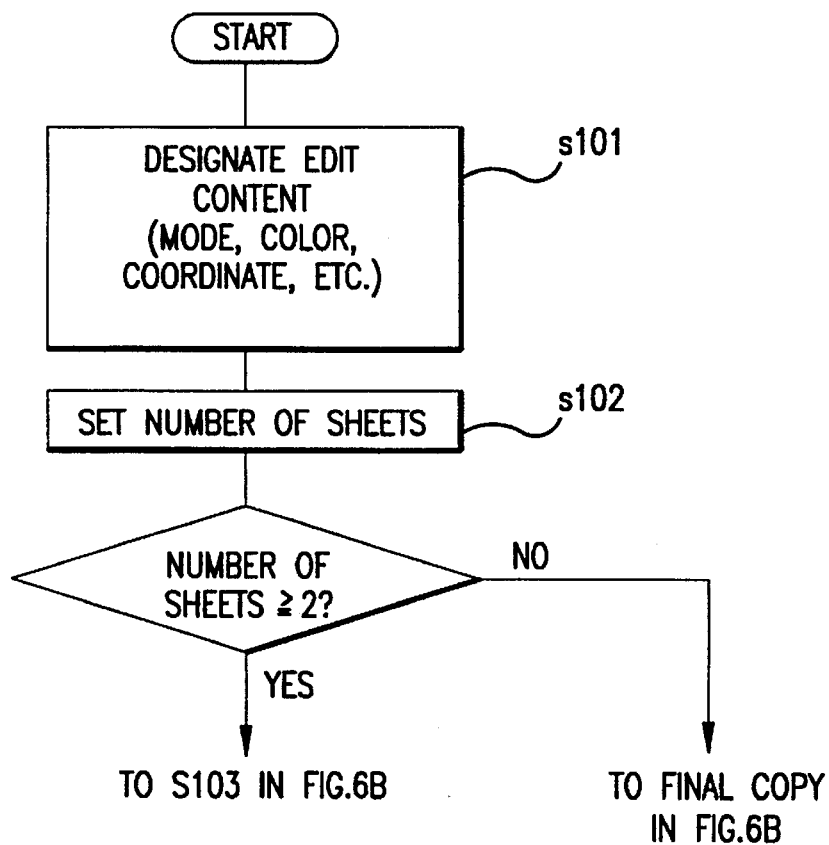
FIGS. 6A and 6B are flowcharts illustrating the operation of the image recording apparatus according to the present invention.
Figure 6B:
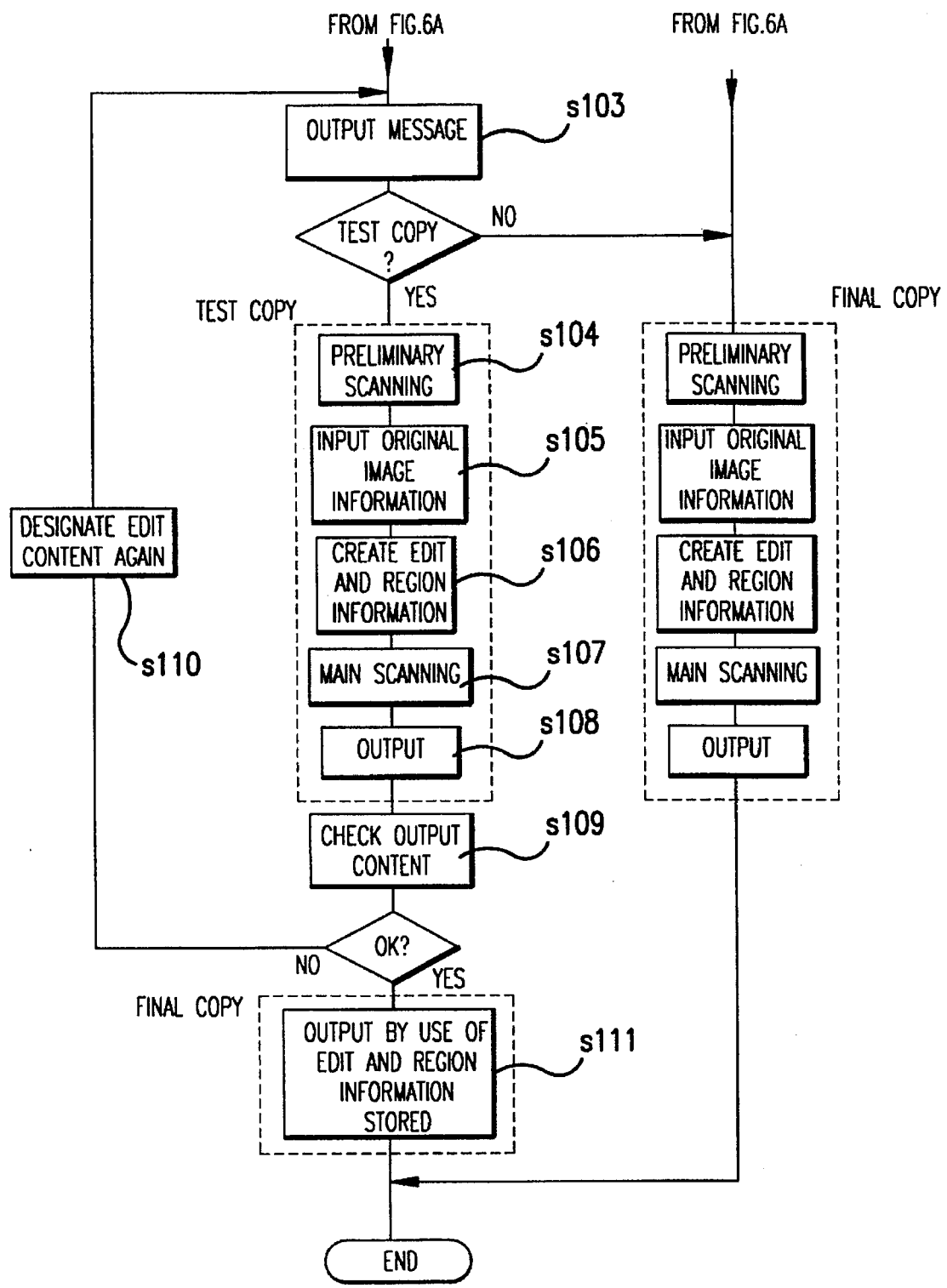
Figure 7A:
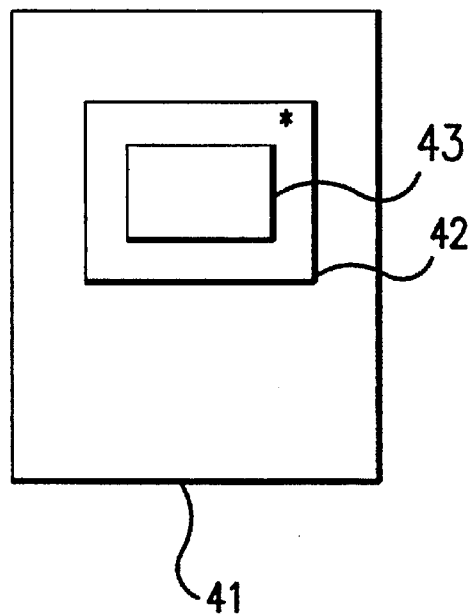
FIGS. 7A and 7B are schematic views illustrating coloring of an edit region of an original as an example of editing of an image.
Figure 7B:
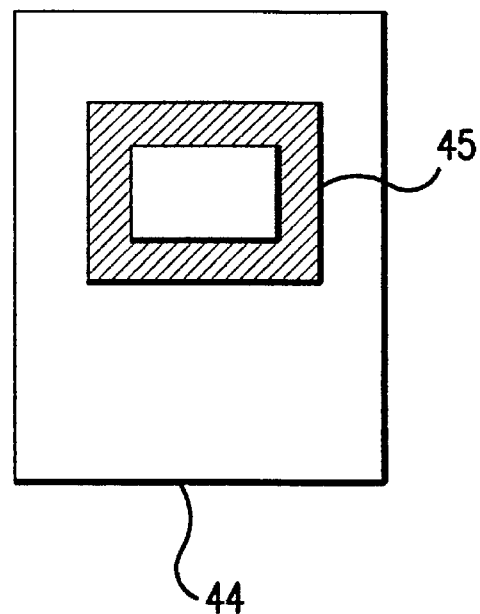

The operation of the image recording apparatus mentioned above will now be described with reference to the flowchart shown in FIGS. 6A and 6B in such a case that an original 41 having an image formed of a rectangle 42 and a rectangle 43 present in the rectangle 42 as shown in FIG. 7A is used and the coloring in an intermediate portion between the rectangle 42 and the rectangle 43 (i.e., a portion defined inside the rectangle 42 and outside the rectangle 43) is performed to edit the image of the original 41 as shown in FIG. 7B. In FIG. 7B, reference numeral 44 denotes a recording sheet of paper, and reference numeral 45 denotes a colored region (shown by shading for convenience) subjected to the coloring processing.

First, the original as a subject to editing is placed on the region designation area ER of the digitizer 13 (see FIGS. 3 and 4), and the window 13a in the function designation area EF is pressed to designate a framing mode such that a frame for defining an edit region to be colored is specified. Then, an appropriate point present in the edit region to be colored (e.g., a point shown by a symbol * in FIG. 7A) is pressed to designate the edit region. A coordinate data of this point designated is stored into a register or a memory (not shown) in the CPU 12. The coordinate of the point to be designated may not be exact, but it is only necessary to locate the point at any position in the region defined inside the rectangle 42 and outside the rectangle 43. Thus, a designation work is very easy. Then, one of the windows 13e to 13g in the color designation area EC formed on the digitizer 13 is pressed to designate a color to be used. For example, the window 13f is pressed to designate blue (S101 in FIG. 6A).

Then, the platen cover 1j is opened and the original is placed on the platen glass 1a of the image input device 1. Thereafter, the platen cover 1j is closed.

Figure 10A:
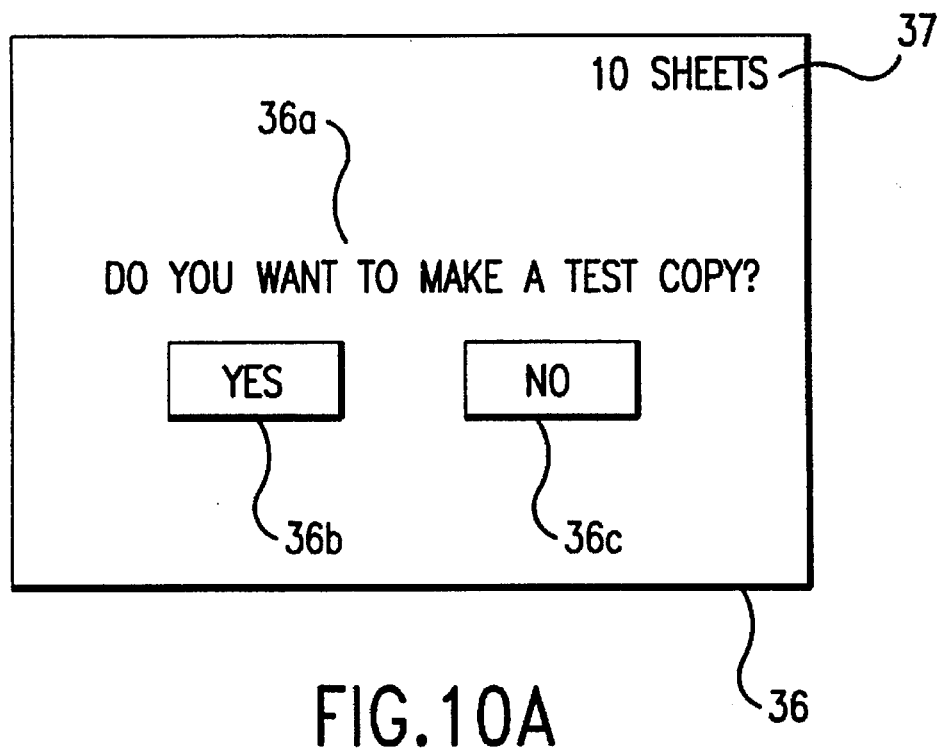
FIGS. 10A and 10B are plan views of a touch panel display on the operation panel shown in FIG. 5, illustrating examples of a displayed condition.

The numeric keys 21 to 30 on the operation panel 20 are operated to set the number of sheets of paper to be recorded. At this time, the number of sheets of paper thus set is displayed on the touch panel display 36 at a given portion 37 as shown in FIG. 10A. For example, the number of sheets of paper is set to ten as shown in FIG. 10A (S102 in FIG. 6A).

If the number of sheets of paper to be recorded is two or more as mentioned above, a message 36a of "Do you want to make a test copy?" and buttons 36b and 36c representing "Yes" and "No", respectively, are displayed on the touch panel display 36 as shown in FIG. 10A (S103 in FIG. 6B).

If the test copy is desired, that is, if an operator desires to visually check the content of the edit operation mentioned above by recording one sheet of paper, either the button 36b of "Yes" displayed on the touch panel display 36 or the start key 35 is pressed by the operator. If the test copy is not desired but a final copy is desired, that is, if the operator desires not to visually check the content of the edit operation but to directly record the plural sheets of paper (ten sheets in this case), the button 36c of "No" is pressed by the operator.

Although the start key 35 has the same function as that of the button 36b of "Yes" displayed on the touch panel display 36 in this preferred embodiment, the start key 35 may have the same function as that of the button 36c of "No", or may have a function different from the functions of the buttons 36b and 36c.

Figure 8A:
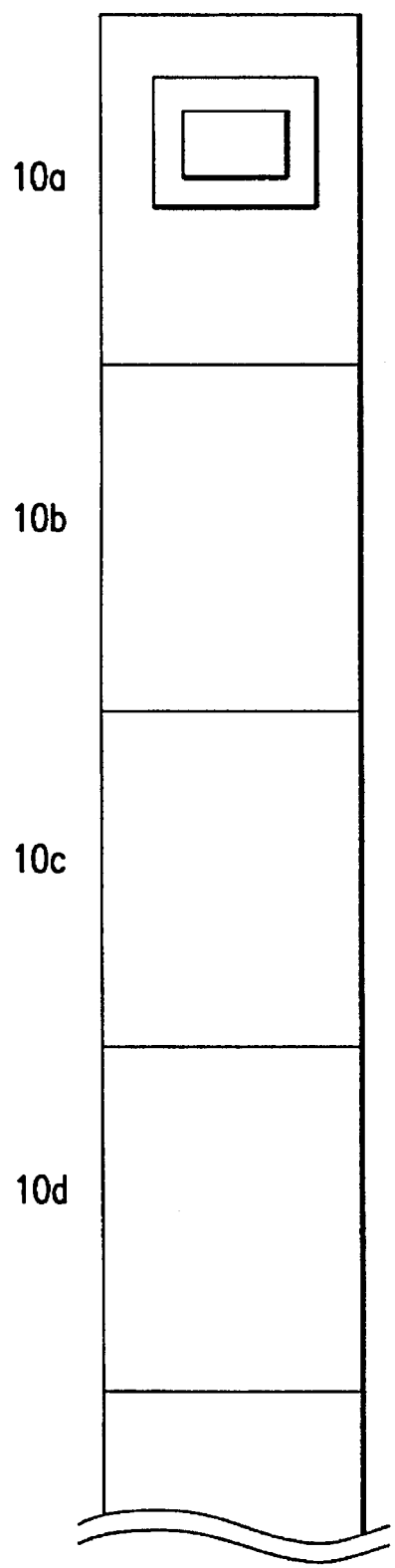
FIGS. 8A and 8B are schematic views illustrating bit patterns stored in a bit map memory in the image recording apparatus shown in FIG. 1.
Figure 8B:
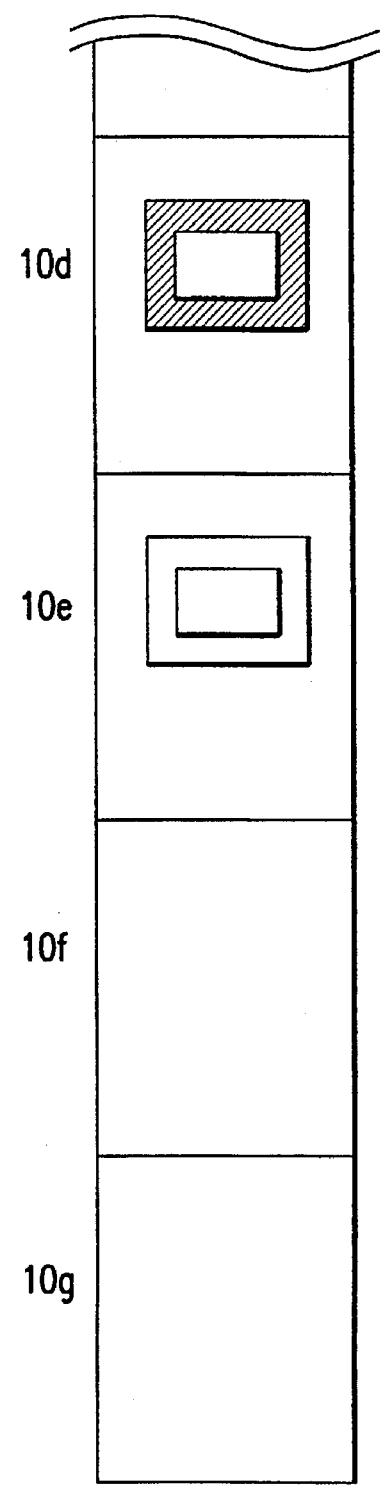

The subsequent operation if the button 36b of "Yes" is pressed will now be described. When the button 36b of "Yes" is pressed by the operator, an optical scanning system including the light source 1b and the mirrors 1c, 1d, and 1e provided in the image input device 1 is moved to start reading of the image of the original. The scanning at this time will be hereinafter referred to as preliminary scanning (S104 in FIG. 6B). The image signal obtained from the image input device 1 by the preliminary scanning is supplied through the A/D converting circuit 2, the binarizing circuit 3, the density converting circuit 7 and the serial-parallel converting circuit 8 to the painting device 9. Then, the image signal is input from the painting device 9 into the bit map memory plane 10a. Accordingly, a bit pattern corresponding to the image of the original is formed on the bit map memory plane 10a as shown in FIG. 8A. In FIGS. 8A and 8B, black represents data "1" and white represents data "0" in the bit map memory 10 (S105 in FIG. 6B).

In this preferred embodiment, the density of picture elements constituting the image data from the image input device 1 is reduced to ¼ in each of row and column. Accordingly, the density of the picture elements of the original image is reduced to 1/16 in area and the image data with the density thus reduced is stored into the bit map memory 10. In this manner, the density of the bit map memory 10 is made smaller than the density of the original image data, so that the capacity of the memory can be reduced to contribute to a reduction in cost of the apparatus. In the density converting circuit 7, a logical sum (OR) of 4×4 picture elements in row and column, i.e., 16 picture elements in area of the image data having a density of 400 dpi, for example, is taken and the result of the logical sum at intervals of 4 picture elements in each of row and column is output as data having a density of 100 dpi. In other words, if at least one of the 16 picture elements is "1" at the density of 400 dpi, the output from the density converting circuit 7 becomes "1" as shown in FIG. 9A, whereas if all the 16 picture elements are "0" at the density of 400 dpi, the output from the density converting circuit 7 becomes "0" as shown in FIG. 9B. According to such a method, an image data of even a fine line can be input into the bit map memory plane 10a without break.

When the preliminary scanning is ended, the gate 11 is opened. Thereafter, according to the edit content inclusive of the frame designation and the color designation in the designated edit region, edit information and region information are stored into the RAM table 4 and the bit map memory planes 10d to 10g as shown in FIG. 8B (S106 in FIG. 6B). This processing is known from Japanese Patent Laid-open No. Hei 2-224568, for example, and is outside the scope of the present invention; so the detailed description thereof will be omitted herein.

Then, main scanning is performed for each recording color to read the image of the original again by using the image input device 1 (S107 in FIG. 6B), and the painting device 9 is operated in synchronism with reading of the image of the original to read bit by bit the data written on the bit map memory planes 10d to 10g of the bit patterns written on all the bit map memory planes 10a to 10g constituting the bit map memory 10 and supply the read data as a 4-bit address signal through the serial-parallel converting circuit 8 to the RAM table 4.

The code (functional code) representing the kind of edit processing and the color to be recorded is preliminarily written in the RAM table 4 by the CPU 12. Accordingly, the functional code corresponding to the edit region painted with the designated color in the bit map memory 10 is read from the RAM table 4 bit by bit. In this preferred embodiment, the region data stored in the bit map memory 10 is data reduced in density to ¼ in each of row and column. Therefore, the data read from the bit map memory 10 is input into a repeating circuit 14 to repeat generation of the same data four times in the directions of row and column, thereby ensuring the correspondence between the original image and the edit region.

Thereafter, the edit region is colored according to the functional code from the repeating circuit 14 in the image processing circuit 5. As the coloring in blue is selected in this case, the edit region is colored in blue.

The image signal for each recording color processed in the image processing circuit 5 is supplied to the image output device 6, thereby obtaining a test recorded image according to the designated edit content on one sheet of recording paper (S108 in FIG. 6B).

Figure 10B:
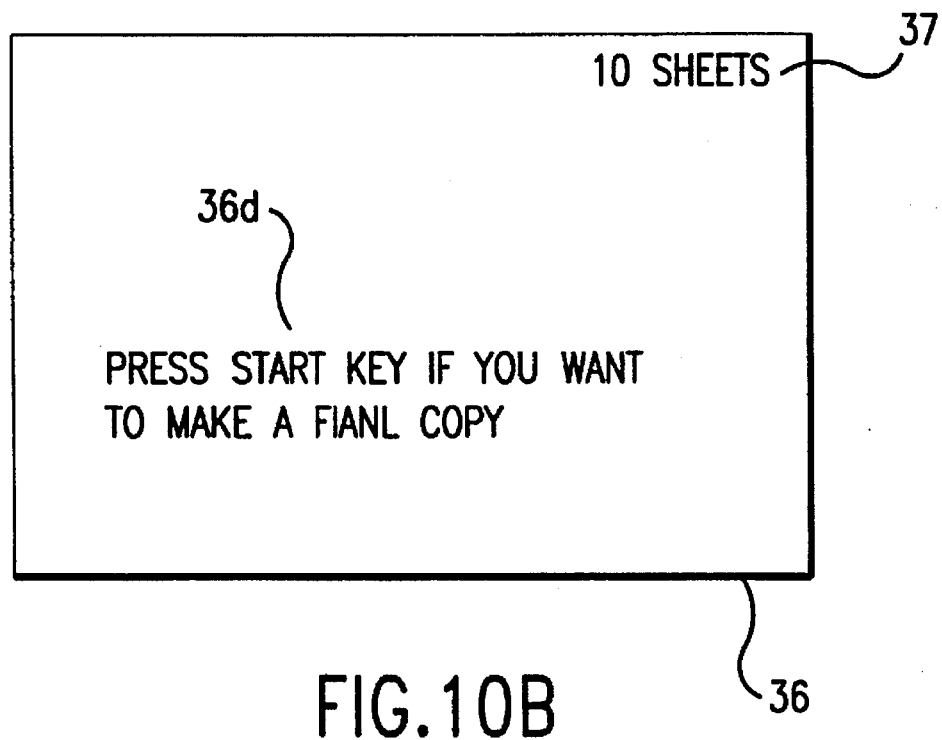

At this time, a message 36d of "Press start key if you want to make a final copy." is displayed on the touch panel display 36 as shown in FIG. 10B. The operator checks the test recorded image obtained above (S109 in FIG. 6B). If the test recorded image is satisfactory, the start key 35 is pressed by the operator, whereas if the test recorded image is not satisfactory, the designation of the edit content is performed again (S110 in FIG. 6B).

If the start key 35 is pressed, record processing for the final copy similar to that in the test copy is performed. However, in the final copy, the preliminary scanning and the re-creation of the region information and the edit information in the bit map memory 10 and the RAM table 4 are not performed, but the region information and the edit information previously created and stored in the bit map memory 10 and the RAM table 4 by the preliminary scanning previously performed are used again and the main scanning is performed for each recording color to obtain a plurality of sheets of recorded paper each having the same edited image (ten sheets in this case) (S111 in FIG. 6B).

Accordingly, the same output image as that obtained in the test copy can be obtained on each sheet also in the final copy.

It is to be noted that the present invention is not limited to the above preferred embodiment but various changes and modifications may be made. For example, rather than outputting a color image as the test recorded image in the above preferred embodiment, a black-and-white image may be output as the test recorded image. That is, if the operator desires to only check whether the designation of the edit region and the edit operation have been exactly performed, the main scanning may be performed once after the preliminary scanning and the coloring of the designated edit region may be replaced by halftoning or shading to obtain a black-and-white output image for the test copy. Alternatively, color output and black-and-white output may be selectively made. Further, in the test copy with the black-and-white output image, it is of course desirable that the edit regions subjected to the same coloring operation should be subjected to the same halftoning or the same shading. Further, although the plural sheets (e.g. ten sheets) .set and displayed at the given portion 37 on the touch panel display 36 by the input from the numeric keys 21 to 30 are recorded in the final copy according to the above preferred embodiment, nine sheets as the remaining sheets obtained by subtracting one sheet finally recorded in the test copy from the ten sheets, because the one sheet finally recorded in the test copy is satisfactory and has the same edited image as that to be recorded in the final copy. In this case, a counter may be once stopped in operation so as to hold the set number of sheets as 10 and the recorded number of sheets as 1 in the test copy and the counter may be restarted in operation at starting of the final copy. Alternatively, the counter may be reset to the set number of sheets as 9 and the recorded number of sheets as 0. Thus, the one recorded sheet having a desired edited image obtained in the test copy can be used without waste and resultantly the ten recorded sheets as the set number of sheets can be obtained in the final copy.

Additionally, in the above preferred embodiment, the edit information and the image information obtained by the preliminary scanning are expanded to bit-mapped data and the main scanning is then performed to obtain test copy output information, whereas in the final copy the edit information stored in the test copy is used and the main scanning is performed again to read image information and expand it to bit-mapped data. Accordingly, such a test copy function can be applied to a conventional image forming apparatus by slightly improving it. As a modification, the bit-mapped data created in the test copy may be retained, and it may be used in the final copy without performing the main scanning. According to this modification, it is more advantageous that no scanning of the original is required in the final copy subsequent to the preliminary scanning.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image recording apparatus for setting an edit region by preliminary scanning of an original and recording an edited image by main scanning of said original, said image recording apparatus comprising:

designation input means for inputting designation of output content of said edited image and designation of edit content of said original;

a bit map memory for storing edit information in an image region of said original;

edit information processing means for setting said edit information in said image region of said original stored in said bit map memory upon said preliminary scanning according to said edit content designated by said designation input means and for reading said edit information from said bit map memory in synchronism with reading of said original upon said main scanning;

image processing means for performing edit processing in said image region of said original according to said edit information read from said bit map memory upon said main scanning;

recording means for recording said edited image; and control means for performing said preliminary scanning and said main scanning to output a test record of said edited image when designation of said test record is input from said designation input means and then performing only said main scanning without said preliminary scanning but using said edit information stored in said bit map memory to output a final record of said edited image when designation of said final record is input from said designation input means after said test record.

2. An image recording apparatus according to claim 1, wherein said control means outputs a black-and-white image as said edited image in making said test record.

3. An image recording apparatus according to claim 1, wherein said control means outputs a plurality of records each having said edited image less in number by one than a set value designated by said designation input means in making said final record after said test record.

4. An image recording apparatus for forming an image by scanning an original, comprising:

image input means for scanning said original to input image information of said original;

edit designating means for designating edit content to said original;

edit storing means for storing said edit content designated by said edit designating means;

test record output designating means for designating output of a test record of said edit content;

information storing means for storing edit information and said image information obtained by said scanning of said original;

final record output designating means for designating output of a final record to be output after said test record output; and image output control means for outputting said test record according to said edit information and said image information obtained by said scanning of said original when said output of said test record is designated by said test record output designating means and then outputting said final record according to said edit information and said image information stored in said information storing means when said output of said final record is designated by said final record output designating means.

5. An image recording apparatus according to claim 4, wherein said image information of said original in outputting said test record is binary data.

6. An image recording apparatus according to claim 1, wherein said designation input means comprises an operation panel for designating said output content of said edited image and a digitizer for designating said edit content to said original.

7. An image recording apparatus according to claim 6, wherein said operation panel comprises a plurality of numeric keys for setting the number of records and a touch panel display having buttons for designating said test record and said final record.

8. An image recording apparatus according to claim 6, wherein said digitizer has a first area for designating said edit region, a second area for designating the kind of edit processing, and a third area for designating a color to be used in said edit region.

9. An image recording apparatus according to claim 8, wherein:

said edit region is designated by placing said original on said first area and then pressing a desired point on said original;

said second area has a plurality of switches corresponding to various kinds of edit processing; and said third area has a plurality of switches corresponding to various colors.

10. An image recording apparatus according to claim 9, wherein said switches of said second area comprise a first switch for designating a frame defining said edit region, a second switch for designating background coloring that a background of characters present in said edit region is to be colored, a third switch for designating painting that said edit region is to be painted out, and a fourth switch for designating character coloring that said background and said characters present in said edit region are to be colored in different colors.

11. An image recording apparatus according to claim 9, wherein said switches of said third area comprise a first switch for designating red, a second switch for designating blue, and a third switch for designating green.

12. An image recording apparatus according to claim 1, wherein said edit information processing means comprises a density converting circuit for reducing a density of image data of said original, a serial-parallel converting circuit for inputting said image data from said density converting circuit, and a painting device for writing said image data from said serial-parallel converting circuit as a bit pattern into said bit map memory and setting said edit information on said bit pattern.

13. An image recording apparatus according to claim 1, further comprising image input means for scanning said original to input image information of said original.

14. An image recording apparatus according to claim 13, wherein said image input device comprises a platen glass on which said original is placed, a light source for directing light through said platen glass onto said original, a mirror for reflecting said light reflected on said original, a lens for imaging said light reflected on said mirror, an image sensor for detecting said light imaged by said lens to output said image information, and a carriage for moving said light source and said mirror relative to said original.

15. An image recording apparatus according to claim 1, wherein said recording means comprises a laser printer.

* * * * *